United States Patent [19]
Maslanka

[11] Patent Number: 5,994,449
[45] Date of Patent: Nov. 30, 1999

[54] RESIN COMPOSITIONS FOR MAKING WET AND DRY STRENGTH PAPER AND THEIR USE AS CREPING ADHESIVES

[75] Inventor: William Walter Maslanka, Landenberg, Pa.

[73] Assignee: Hercules Incorporated, Wilmington, Del.

[21] Appl. No.: 08/788,731

[22] Filed: Jan. 23, 1997

[51] Int. Cl.⁶ .................................................. C08L 29/02
[52] U.S. Cl. ........................ 524/503; 524/514; 525/58; 525/60; 525/61; 162/111
[58] Field of Search ................... 525/60, 58, 61; 524/503, 514

[56] References Cited

U.S. PATENT DOCUMENTS

| | | | |
|---|---|---|---|
| 2,872,313 | 2/1959 | House et al. ................ | 92/1.4 |
| 2,926,154 | 2/1960 | Keim ............................ | 260/29.2 |
| 3,427,217 | 2/1969 | Miller ........................... | 162/6 |
| 4,421,602 | 12/1983 | Brunnmueller ............. | 162/168.2 |
| 4,501,640 | 2/1985 | Soerens ........................ | 162/111 |
| 4,528,316 | 7/1985 | Soerens ........................ | 29/4 |
| 4,684,439 | 8/1987 | Soerens ........................ | 162/111 |
| 4,788,243 | 11/1988 | Soerens ........................ | 524/503 |
| 4,880,497 | 11/1989 | Pfohl et al. ................... | 162/135 |
| 4,921,621 | 5/1990 | Costello et al. ............. | 252/8.513 |
| 4,952,656 | 8/1990 | Lai et al. ...................... | 525/328.2 |
| 5,037,927 | 8/1991 | Itagaki et al. ............... | 526/307.7 |
| 5,126,395 | 6/1992 | End et al. ..................... | 524/801 |
| 5,187,219 | 2/1993 | Furman, Jr. .................. | 524/377 |
| 5,246,544 | 9/1993 | Hollenberg et al. ........ | 162/111 |
| 5,300,566 | 4/1994 | Pinschmidt, Jr. et al. .. | 525/60 |
| 5,330,619 | 7/1994 | Johnson et al. .............. | 162/5 |
| 5,338,807 | 8/1994 | Espy et al. ................... | 525/430 |
| 5,374,334 | 12/1994 | Sommese et al. ............ | 162/111 |
| 5,427,652 | 6/1995 | Darlington et al. .......... | 162/164.3 |
| 5,567,798 | 10/1996 | Dulany et al. ............... | 528/332 |

FOREIGN PATENT DOCUMENTS

| | | |
|---|---|---|
| 979579 | 12/1975 | Canada . |
| 585955-A1 | 3/1994 | European Pat. Off. . |
| 0606889B1 | 7/1994 | European Pat. Off. . |
| 94/20682 | 9/1994 | WIPO . |

OTHER PUBLICATIONS

Schmalz, TAPPI 44, No. 4, pp. 275–280 (Apr., 1961).
L.H. Sperling & V. Mishra, in "Polymers For Advanced Technologies, vol. 7" pp. 197–208.
TAPPI Method T 205PM–88 (1988).

*Primary Examiner*—Ana Woodward
*Attorney, Agent, or Firm*—Martin F. Sloan

[57] ABSTRACT

Disclosed are resin compositions that are the reaction product of epihalohydrin with a mixture of polyaminoamide and vinyl amine polymer containing a minimum of about 1 mole % vinyl amine monomer units, wherein said polyaminoamide comprises the reaction product of dicarboxylic acid, or a derivative thereof, with polyamine selected from the group consisting of methyl bis(3-aminopropyl)amine and polyalkylenepolyamine containing from two to four alkylene groups having two to four carbons, two primary amine groups, and one to three secondary amine groups. Also disclosed are a process for creping fibrous webs utilizing the resin compositions, and creped paper prepared by the process. Also disclosed is wet and dry strength paper containing the resin compositions and processes for creping fibrous webs utilizing the resin compositions as creping adhesives.

46 Claims, No Drawings

RESIN COMPOSITIONS FOR MAKING WET AND DRY STRENGTH PAPER AND THEIR USE AS CREPING ADHESIVES

FIELD OF THE INVENTION

This invention relates to new resins for paper and their uses to provide wet and dry strength to paper and as creping adhesives for paper.

BACKGROUND OF THE INVENTION

Wet strength resins are often added to paper and paperboard at the time of manufacture. In the absence of wet strength resins, paper normally retains only 3% to 5% of its strength after being wetted with water. However, paper made with wet strength resin generally retains at least 10%–50% of its strength when wet. Wet strength is useful in a wide variety of paper applications, some examples of which are towelling, milk and juice cartons, paper bags, and liner board for corrugated containers.

Dry strength is also a critical paper property, particularly in light of the recent trend for paper manufacturers to use high yield wood pulps in paper in order to achieve lower costs. These high yield wood pulps generally yield paper with significantly reduced strength when compared to paper made from highly refined pulps.

Commercially available wet strength resins include Kymene®557H, Kymene®557LX, Kymene®557SLX, Kymene®557ULX, Kymene®Plus, Kymene®450 and Kymene®736 wet strength resins, available from Hercules Incorporated, Wilmington, Del. Wet strength resins, such as those listed above, also provide increased dry strength to paper.

Because of increased commercial emphasis on developing paper products based on recovered cellulose, there is growing interest in developing paper which is readily repulpable. Paper and paperboard waste materials are difficult to repulp in aqueous systems without special chemical treatment when they contain wet strength resins. Previous to the instant invention, improving the repulpability of paper containing wet strength resins has been achieved by modifying the repulping conditions by incorporation of repulping agents, usually inorganic oxidizing agents or chlorine containing materials. Such methods are disclosed, for example, in U.S. Pat. No. 2,872,313 to House et al., U.S. Pat. No. 3,427,217 to Miller, and U.S. Pat. No. 5,330,619 to Henry et al., by Schmalz, in TAPPI, 44, no. 4, pp 275–280, April, 1961, by Espy in European Patent Application Publication No. 585,955-A, and by Caropreso et al., in PCT International Publication No. WO94/20682. Since many of the repulping processes used for paper containing wet and/or dry strength resins result in formation of environmentally undesirable chlorine-containing degradation products, involve strong oxidizing agents, or proceed slowly, there is need for improved resins that are capable of providing wet and dry strength paper that is readily repulpable without added repulping agents or special chemical treatments.

Resins similar to those used for imparting strength to paper are also often used as creping adhesives. In the manufacture of some paper products such as facial tissue, bathroom tissue, or paper towers, the paper web is conventionally subjected to a creping process in order to give it desirable textural characteristics, such as softness and bulk. The creping process typically involves adhering the web, a cellulose web in the case of paper, to a rotating creping cylinder, such as the apparatus known as a Yankee dryer, and then dislodging the adhered web with a doctor blade. The impact of the web against the doctor blade ruptures some of the fiber-to-fiber bonds within the web and causes the web to wrinkle or pucker.

The severity of this creping action is dependent upon a number of factors, including the degree of adhesion between the web and the surface of the creping cylinder. Greater adhesion causes increase softness, although generally with some loss of strength. In order to increase adhesion, a creping adhesive may be used to enhance any naturally occurring adhesion that the web may have due to its water content, which will vary widely depending on the extent to which the web has been previously dried. Creping adhesives should also prevent wear of the dryer surface and provide lubrication between the doctor blade and the dryer surface and reduce chemical corrosion, as well as controlling the extent of creping. A creping adhesive coating that adheres the sheet just tightly enough to the drum will give a good crepe, imparting absorbance and softness with the least possible loss of paper strength. If adhesion to the dryer drum is too strong, the sheet may pick or even "plug", i.e., underride the doctor blade, and wrap around the dryer drum. If there is not enough adhesion, the sheet will lift off too easily and undergo too little creping.

The creping adhesive, usually as an aqueous solution or dispersion, is generally sprayed onto the surface of the creping cylinder or drum, e.g., a Yankee dryer. This improves heat transfer, allowing more efficient drying of the sheet. If the pulp furnish sticks too strongly to the creping cylinder, release agents can be sprayed on the cylinder. The release agents are typically hydrocarbon oils. These agents aid in the uniform release of the tissue web at the creping blade, and also lubricate and protect the blade from excessive wear.

A creping adhesive composition is disclosed in U.S. Pat. No. 5,187,219 to Furman. The composition comprises a water-soluble glyoxylated acrylamide/diallyldimethylammonium chloride polymer and a water-soluble polyol having a molecular weight below 3000 as a plasticizer for the polymer.

U.S. Pat. No. 5,246,544 to Hollenberg et al., discloses a reversibly crosslinked creping adhesive which contains a nonself-crosslinkable material that is a polymer or oligomer having functional groups that can be crosslinked by ionic crosslinking and at least one metal, cationic crosslinking agent having a valence of four or more. The adhesive can also contain additives to modify the mechanical properties of the crosslinked polymers, e.g., glycols, polyethylene glycols, and other polyols such as simple sugars and oligosaccharides.

Polyaminoamide/epichlorohydrin creping adhesives are disclosed in U.S. Pat. No. 5,338,807 to Espy et al. and in Canadian Patent 979,579 Giles et al.

U.S. Pat. No. 5,374,334 to Sommese et al., discloses a creping adhesive which is a crosslinked vinyl amine/vinyl alcohol polymer containing from about 1 to about 99% vinyl amine. Epichlorohydrin is disclosed as a crosslinking agent.

U.S. Pat. No. 4,684,439 and 4,788,243 to Soerens, disclose creping adhesives comprising mixtures of polyvinyl alcohol and water soluble thermoplastic polyamide resin comprising the reaction product of a polyalkylenepolyamine, a saturated aliphatic dibasic carboxylic acid and a poly(oxyethylene) diamine.

In U.S. Pat. Nos. 4,501,640 and 4,528,316 to Soerens, there is disclosed a creping adhesive comprising a mixture of polyvinyl alcohol and a water soluble, thermosetting cationic polyamide resin.

Commercially available creping adhesives include Crepetrol®190, Crepetrol®290, Crepetrol®80E cationic polymers, available from Hercules Incorporated, Wilmington, Del.

There is a need for improved creping adhesives with adhesion improved over that obtained with the commonly used polyaminoamide/epichlorohydrin creping adhesives.

SUMMARY OF THE INVENTION

This invention relates to a resin compositions comprising the reaction product of epihalohydrin with a mixture comprising polyaminoamide and vinyl amine polymer containing from about 1 to about 100 mole percent vinyl amine monomer units.

In another embodiment, the invention relates to a process for creping fibrous webs comprising: (a) providing a fibrous web; (b) applying to a drying surface for the fibrous web the resin composition comprising the reaction product of epihalohydrin with polyaminoamide and vinyl amine polymer containing from about 1 to about 100 mole percent vinyl amine monomer units; (c) pressing the fibrous web against the drying surface to adhere the web to the drying surface; and (d) dislodging the web from the drying surface with a creping device to crepe the fibrous web. In a further embodiment the invention also relates to paper creped by this process.

In yet another embodiment the invention relates to paper that comprises cellulose pulp fiber and resin compositions comprising the reaction product of epihalohydrin with polyaminoamide and vinyl amine polymer containing from about 1 to about 100 mole percent vinyl amine monomer units. The paper has wet and dry strength greater than paper containing no resin, and can be repulped substantially faster than paper that is the same, except that instead of the resin composition, it contains epihalohydrin/polyaminoamide resin at the same level. The invention also embodies processes for making and repulping paper the resin compositions.

DETAILED DESCRIPTION OF THE INVENTION

The preferred polyaminoamides for this invention are produced by reacting a dicarboxylic acid, or a derivative thereof, with methyl bis(3-aminopropyl) amine or with a polyalkylenepolyamine containing from two to four alkylene groups having two to four carbons, two primary amine groups, and one to three secondary amine groups. Dicarboxylic acid derivatives suitable for preparing the polyaminoamides include esters, anhydrides and acid halides.

Procedures for preparing polyaminoamides from polyalkylenepolyamines are described in U.S. Pat. No. 2,926,154, to Keim, which is incorporated herein by reference in its entirety. Procedures utilizing methyl bis(3-aminopropyl) amine for preparation of polyaminoamides are described in U.S. Pat. No. 5,338,807 to Espy et al., which is incorporated herein by reference in its entirety.

The preferred polyalkylenepolyamines for use in this invention are diethylenetriamine, triethylenetetramine or tetraethylenepentamine wherein the alkylene groups is ethylene. The most preferred polyalkylenepolyamine is diethylenetriamine.

Dicarboxylic acids for use in preparing the polyaminoamides include saturated aliphatic dicarboxylic acids containing three to ten carbon atoms, aromatic dicarboxylic acids such as phthalic and terephthalic acids, and diglycolic acid.

Preferred dicarboxylic acids are saturated aliphatic dicarboxylic acids containing three to ten carbon atoms selected from the group consisting of malonic acid, succinic acid, glutaric acid, adipic acid, pimelic acid, suberic acid and azelaic acid. More preferred dicarboxylic acids are adipic, malonic, succinic and azelaic acids. The most preferred dicarboxylic acids are adipic and azelaic acids.

Polyaminoamides made from polyalkylenepolyamines have the following structural formula I for the repeating unit:

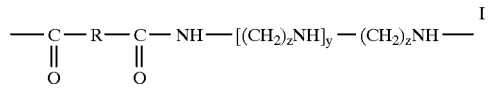

where R is an organic radical, y is 1 to 3 and z is 2 to 4. The unit molecular weight is defined as the molecular weight of this repeating unit.

A secondary amine equivalent weight of the polyaminoamide is calculated by dividing the unit molecular weight by y in the above formula. Thus, for the polyaminoamide made from diethylenetriamine and adipic acid (R=$(CH_2)_4$, y=1 and z=2), the unit molecular weight and the secondary amine equivalent weight are both 213.3. For the polyamide from triethylenetetramine and adipic acid (R=$(CH_2)_4$, y=2 and z=2), the unit molecular weight is 256.4, and secondary amine equivalent weight is 128.2. The number of moles of polyaminoamide in a particular quantity is calculated by dividing the weight by the unit molecular weight. The number of equivalents of secondary amine is calculated by dividing the weight by the secondary amine equivalent weight.

Polyaminoamides made utilizing methyl bis(3-aminopropyl) amine have the following structural formula II for the repeating unit:

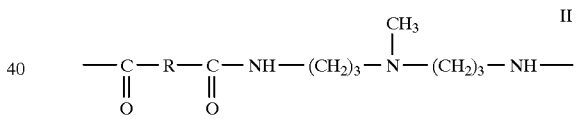

where R is an organic radical. The unit molecular weight is defined as the molecular weight of this repeating unit.

Polyaminoamides of structure II contain tertiary amine, and the unit molecular weight and the amine equivalent weight are the same. Thus, for the polyaminoamide made from methyl bis(3-aminopropyl) amine and adipic acid [R=$(CH_2)_4$], the unit molecular weight and the tertiary amine equivalent weight are both 255.4.

Structurally, the vinyl amine polymers are homopolymers of vinyl amine or copolymers of vinyl amine and other vinyl monomers, where the polymers contain from about 1 to about 100 mole percent vinyl amine monomer units based on the total number of moles of monomer units present. Hereinafter, the term "vinyl amine polymer" is intended to mean both vinyl amine polymers and copolymers. Other monomers that my be present in the vinyl amine copolymers include, but are not restricted to, vinyl alcohol, N-vinyl formamide and vinyl acetate. Preferably the vinyl amine copolymers for use in the invention contain vinyl alcohol comonomer. The molecular weight of the vinyl amine polymer or copolymer for this invention is not critical. However, the preferred minimum molecular weight is about 10,000, more preferably about 20,000 and most preferable about 30,000. The maximum molecular weight is preferably about 200,000, more preferably about 150,000, and most preferably about 140,000.

The amount of amine groups in the vinyl amine polymers is defined in terms of the mole percent of vinyl amine present. Preferably, the minimum vinyl amine level is about 1 mole percent, more preferably, about 4 mole percent, and most preferably about 5 mole percent. The maximum vinyl amine level is about 100 mole percent, i.e., essentially a homopolymer of vinyl amine. Preferably the maximum vinyl amine level is about 50 mole percent, more preferably about 25 mole percent, and most preferably about 12 mole percent. A preferred comonomer for this invention is vinyl alcohol.

Vinyl amine copolymers containing vinyl alcohol comonomer at a minimum level of about 1 mole percent are preferred for the invention. The maximum level of vinyl alcohol comonomer is about 99 mole percent. Preferably the maximum is about 96 mole percent, and more preferably about 95 mole percent.

Processes for making the vinyl amine polymers and copolymers of this invention are well know in the art. U.S. Pat. Nos. 5,126,395; 5,037,927; 4,952,656; 4,921,621 and 4,880,497, all of which are incorporated herein by reference in their entireties, describe methods for preparing precursors to the copolymers of this invention. The N-vinyl formamide polymers and vinyl acetate/vinyl formamide copolymers are susceptible to hydrolysis, which converts some or all of the amide groups to amine groups and ester groups to hydroxyls. The hydrolysis is described in U.S. Pat. No. 4,421,602, which is incorporated herein by reference in its entirety.

The unit molecular weight of vinyl amine polymer or copolymer is defined as follows:

unit molecular weight=[mole % vinyl amine]/100× [molecular weight vinyl amine]+[mole % comonomer (s)]/100×[molecular weight comonomer(s)].

The number of moles of vinyl amine polymer or copolymer in a particular quantity is calculated by dividing the weight by the unit molecular weight.

The number of equivalents of amine present in a given amount of vinyl amine polymer or copolymer is calculated by multiplying the number of moles (weight÷unit molecular weight) by mole percent vinyl amine present.

The synthesis of the resin composition of this invention involves reaction of epihalohydrin, preferably epichlorohydrin, with a mixture of polyaminoamide and vinyl amine polymer in aqueous solution. Either the epihalohydrin may be added to the mixture of polyaminoamide and vinyl amine polymer, or the mixture of polyaminoamide and vinyl amine polymer may be added to epihalohydrin. The former method is preferred. The conditions for carrying out the reaction with epihalohydrin are essentially the same as those used for the preparation of polyaminoamide/ epihalohydrin resins. Typical conditions are disclosed in U.S. Pat. No. 2,926,154, which is incorporated herein by reference in its entirety.

The relative amounts of polyaminoamide and vinyl amine polymer used for reaction with epihalohydrin are most conveniently specified in terms of the ratio of equivalents of polyaminoamide secondary or tertiary amine to the moles of vinyl amine polymer (calculated using the unit molecular weight). The maximum value of this ratio is preferably about 10:1, more preferably 9:1, and most preferably 2:1. The minimum value of this ratio is preferably about 0.1:1, more preferably about 0.6:1, and most preferably about 1:1.

In the reaction of polyaminoamide and vinyl amine polymer with epihalohydrin, the maximum ratio of moles of epihalohydrin to total equivalents of free amine is preferably about 2:1, more preferably about 1.5:1 and most preferably about 1.3:1. The preferred minimum ratio of moles of epihalohydrin to total equivalents of amine is about 0.1:1, a more preferred minimum ratio about 0.15:1, and a most preferred minimum ratio about 0.2:1.

The following discussion regarding the structure of the resin composition of the invention is speculative and should not be construed an limiting the invention.

While the structure of the resin composition has not been determined, it is believed that it can be best described as an interpenetrating polymer network (IPN). IPN's are discussed by L. H. Sperling & V. Mishra, in "Polymers for Advanced Technologies, Vol. 7", pp. 197–208. They are described as a combination of two or more polymers in network form, at least one of which is polymerized and/or crosslinked in the immediate presence of the other(s), the idea being to cause molecular interpenetration of the networks.

There are two general types of IPN's: the "classical" IPN, and the semi-IPN or pseudo IPN. In the classical IPN, two polymers, A and B, are crosslinked to form network structures in the presence of each other without reacting with each other. That is, there are A—A and B—B linkages formed. The semi-IPN consists of a mixture of two polymers, A and B, in which only one of the polymers is crosslinked, while the other is present in the uncrosslinked state.

The two polymers used in this invention are polyaminoamide (polymer "A") and vinyl amine polymer (polymer "B"). It is believed that these moieties become linked to themselves and also to each other when reacted with epichlorohydrin. This is to say, in the reaction of A and B with epichlorohydrin A—A and B—B linkages are formed in a classical IPN, and A-B linkages are formed as well. Thus, the polymers of this invention are actually a combination of an A-B crosslinked polymer and an IPN. This differs from the classic IPN because no A-B polymer links are formed in a classic IPN, only A—A and B—B links. Thus, these materials can be considered a special case of IPN, or as a hybrid IPN/A-B crosslinked polymer.

Fibrous webs are creped using the compositions of this invention by: (1) applying the composition described above to a drying surface for the web or to the web; (2) pressing the fibrous web against the drying surface to effect adhesion of the web to the drying surface; and (3) dislodging the web from the drying surfaces with a creping device such as a doctor blade to crepe the fibrous web. Preferably, in step (1), the composition is applied to the drying surface for the web. The preferred fibrous web is a cellulosic web.

Preferably the creping adhesive is applied in aqueous solution containing from about 0.1 to about 10 weight percent of the resin composition. More preferably the resin composition is in solution at the level of about 0.25 to about 5 weight percent, and most preferably at about 0.5 to about 2 weight percent.

The drying surface most commonly used in commercial operations is a Yankee dryer, and the aqueous solution of adhesive will most often be applied to the creping cylinder or drum by spraying. Alternatively, however, it can be added by application to the fibrous web, preferably by spraying. In the case of cellulose webs, i.e. paper, the creping adhesive can be added at the wet end of the paper machine by application to the wet web. In some situations it may be possible to add the creping adhesive to the pulp before formation of the sheet.

It has been found that the creping adhesives of this invention produce adhesion that is superior to that of two commercially used creping adhesives, Kymene®557H wet strength resin and Crepetrol 80E cationic polymer, both available from Hercules Incorporated, Wilmington, Del.

Other ingredients, in particular, agents which modify adhesion of the web to the drying surface, can used in conjunction with the creping adhesives of this invention. Such agents, also know as release agents or plasticizers, include water soluble polyols, glycols, polyethylene glycols, sugars, oligosaccharides and hydrocarbon oils. Additional release agents are disclosed in commonly owned copending application Ser. No. 08/643,645, filed May 6, 1996, which is incorporated herein by reference in its entirety.

The process for making paper utilizing the resin compositions of this invention comprises: (a) providing an aqueous pulp suspension; (b) adding to the aqueous pulp suspension the resin and (c) sheeting and drying the aqueous pulp suspension produced in (b) to obtain paper.

The aqueous pulp suspension of step (a) of the process is obtained by means well known in the art, such as know mechanical, chemical and semichemical, etc., pulping processes. Normally, after the mechanical grinding and/or chemical pulping step, the pulp is washed to remove residual pulping chemicals and solubilized wood components. Either bleached or unbleached pulp fiber may be utilized in the process of this invention. Recycled pulp fibers are also suitable for use.

In step (b), resin of this invention preferably is added to pulp slurry in a minimum amount of about 0.1 weight percent based on the dry weight of the pulp. A more preferable minimum amount is about 0.2 weight percent. The preferable maximum amount of resin composition is about 5 weight percent. A more preferable maximum is about 3 weight percent, and the most preferable maximum about 1.5 weight percent. The resin composition is generally added in the form of an aqueous solution. In addition to the resin, other materials normally used in paper may be added as well. These include, for example, sizing agents, pigments, alum, brightening agents, dyes and dry strength agents, added in amounts well known in the art.

Step (c) is carried out according to procedures well known to those skilled in the art of papermaking.

Paper containing the resin of this invention can be repulped faster, or substantially more completely in a standard length of time, than can paper that is the same, except that instead of the strength resin, it contains epihalohydrin/polyaminoamide resin at the same level. Paper pulpability has been determined using a disintegrator described in TAPPI method T205 OM-88, (1988), which is incorporated herein by reference. Preferably strength resin compositions for improving repulpability are made from amounts of polyaminoamide and vinyl amine polymer such that the ratio of equivalents of polyaminoamide secondary amine to moles of vinyl amine polymer is not greater than about 1:1.5. More preferably the ratio of equivalents of polyaminoamide secondary amine to moles of vinyl amine polymer of the mixture is not greater than about 1:2.3, and most preferably no greater than about 1:4.

Paper made by the process of this invention has wet strength that is substantially greater than that of paper that is the same, except that it contains no strength resin. For development of wet strength it is preferred that the polyaminoamide used for preparation of the strength resin is the reaction product of dicarboxylic acid containing from three to ten carbon atoms and a polyalkylenepolyamine containing from two to four alkylene groups having two to four carbons, at least two primary amine groups, and one to three secondary amine groups. More preferably the polyaminoamide is the reaction product of adipic acid and diethylenetriamine.

For optimum wet strength it is preferred that the ratio of equivalents of polyaminoamide secondary or tertiary amine to moles of vinyl amine polymer is about 1:1.5 or greater. More preferably ratio of equivalents of polyaminoamide secondary or tertiary amine to moles of vinyl amine polymer will be about 2:1 or greater.

The paper of this invention also has dry strength greater than that of paper that is the same, except that instead of the strength resin, it contains no strength additive.

This invention is illustrated by the following examples, which are exemplary only and not intended to be limiting. All percentages, parts, etc., are by weight, based on the weight of the dry pulp, unless otherwise indicated.

EXAMPLES 1–20

These examples describe the preparation of the reaction products of epichlorohydrin and mixtures of vinyl amine/vinyl alcohol copolymer and polyaminoamide prepared from adipic acid and diethylenetriamine. The general procedure used was as follows (Example 1).

A polyaminoamide was prepared from adipic acid and diethylenetriamine by the method described in U.S. Pat. No. 2,926,154, which is incorporated herein by reference in its entirety. The intrinsic viscosity of an aqueous solution 1 of the polyaminoamide was 0.132 dl/g.

Polyaminoamide, 93 g of a 51.6% aqueous solution (0.225 equivalents of amine) was charged to a reaction vessel and diluted with water to a total weight of 222 g. There was then added 11 g of a 9.82% aqueous solution (0.0245 moles) of vinyl amine copolymer, (6 mole % vinyl amine, 94 mole % vinyl alcohol, unit molecular weight 43.99), available from Air Products and Chemicals, Inc., Allentown, Pa. To the resulting solution there was added 26.4 g (0.228 moles) of epichlorohydrin, and then the reaction mixture was heated to 60–65° C. and maintained at this temperature until a Gardner-Holt viscosity of "J" was reached. Then the crosslinking reaction was terminated by adding 332 ml of cold water and adjusting the pH to 4.5 with concentrated sulfuric acid.

The final product had a total solids of 12%, pH 4.5 and Brookfield viscosity of 46 cps.

In Examples 2–20, the reactions were carried out in the same way and differed from Example 1 in the mole percent vinyl amine in the vinyl amine/vinyl alcohol copolymer, the ratio of polyaminoamide to the copolymer and the ratio of moles of epichlorohydrin to total amine equivalents. Table 1 summarizes the synthesis data for Examples 1–11 where the intrinsic viscosity of the polyaminoamide was 0.132 dL/g, and the ratio of moles of epichlorohydrin to total amine equivalents was 1.26; and Table 2 summarizes the data for Examples 12–20 where the intrinsic viscosity of the polyaminoamide was 0.085 and the ratio of moles of epichlorohydrin to total amine equivalents was 0.25. In both cases the total amine equivalents are the sum of the equivalents of secondary amine available from polyaminoamide and equivalents of amine available from vinyl amine polymer.

TABLE 1

Reaction of Epichlorohydrin with Mixtures of Adipic
Acid-Diethylenetriamine (DETA)
Polyaminoamide and Vinyl Amine/Vinyl Alcohol Copolymer[1]
(Ratio: moles of epichlorohydrin to total amine equivalents = 1.26)

| Example No. | Moles[3] Polyamino-amide | Moles Vinyl Amine/Vinyl Alc. copolymer | Total Amine[2] Equivalents | Total Solids (%) | Brookfield Viscosity (cps) |
|---|---|---|---|---|---|
| Vinyl amine/vinyl alcohol copolymer containing 6 mole % vinyl amine ||||||
| 1 | 0.225 | 0.025 | 0.2265 | 12.0 | 46 |
| 2 | 0.175 | 0.075 | 0.1795 | 12.4 | 36 |
| 3 | 0.150 | 0.100 | 0.156 | 12.3 | 34 |
| 4 | 0.125 | 0.125 | 0.1325 | 12.1 | 30 |
| 5 | 0.10 | 0.150 | 0.109 | 12.3 | 30 |
| Vinyl amine/vinyl alcohol copolymer containing 12 mole % vinyl amine ||||||
| 6 | 0.225 | 0.025 | 0.228 | 12.3 | 68 |
| 7 | 0.200 | 0.050 | 0.206 | 12.5 | 52 |
| 8 | 0.175 | 0.075 | 0.184 | 12.5 | 24 |
| 9 | 0.150 | 0.100 | 0.162 | 12.4 | 18 |
| 10 | 0.125 | 0.125 | 0.140 | 12.5 | 14 |
| 11 | 0.100 | 0.150 | 0.118 | 12.5 | 20 |

[1]The pH of each final product solution was 4.5.
[2]For Examples 1–5 this value is the sum of the moles of polyaminoamide and 0.06 × moles of vinyl amine copolymer.
For Examples 6–11 this value is the sum of the moles of polyaminoamide and 0.12 × moles of vinyl amine copolymer.
[3]Intrinsic viscosity of the diethylenetriamime/adipic acid polyaminoamide = 0.132 dL/g.

TABLE 2

Reaction of Epichlorohydrin with Mixtures of Adipic
Acid-Diethylenetriamine (DETA)
Polyaminoamide and Vinyl Amine/Vinyl Alcohol Copolymer[1]
(Ratio: moles of epichlorohydrin to total amine equivalents = 0.25)

| Example No. | Moles[3] Polyamino-amide | Moles Vinyl Amine/Vinyl Alc. copolymer | Total Amine[2] Equivalents | Total Solids (%) | Brookfield Viscosity (cps) |
|---|---|---|---|---|---|
| Vinyl amine/vinyl alcohol copolymer containing 6 mole % vinyl amine ||||||
| 12 | 0.225 | 0.025 | 0.2265 | 5.2 | 11 |
| 13 | 0.200 | 0.050 | 0.203 | 5.3 | 12 |
| 14 | 0.175 | 0.075 | 0.1795 | 5.2 | 10 |
| 15 | 0.150 | 0.100 | 0.156 | 5.1 | 10 |
| 16 | 0.125 | 0.125 | 0.1325 | 5.1 | 10 |
| 17 | 0.100 | 0.150 | 0.109 | 5.0 | 9 |
| Vinyl amine/vinyl alcohol copolymer containing 12 mole % vinyl amine ||||||
| 18 | 0.225 | 0.025 | 0.228 | 5.7 | 10 |
| 19 | 0.175 | 0.075 | 0.184 | 5.1 | 10 |
| 20 | 0.125 | 0.125 | 0.140 | 5.7 | 11 |

[1]The pH of the product solution in Example 12 was 8.5 and in Example 20 was 8.2.
The pH in the remaining examples was 8.4.
[2]For Examples 12–17 this value is the sum of the moles of polyaminoamide and 0.06 × moles of vinyl amine copolymer.
For Examples 18–20 this value is the sum of the moles of polyaminoamide and 0.12 × moles of vinyl amine copolymer.
[3]Intrinsic viscosity of the diethylenetriamine/adipic acid polyaminoamide = 0.085 dL/g.

EXAMPLES 21–28

These examples describe the preparation of the reaction products of epichlorohydrin and mixtures of vinyl amine/vinyl alcohol copolymer and polyaminoamide prepared from adipic acid and methyl bis(3-aminopropyl)amine. The general procedure used as follows (Example 21).

A polyaminoamide was prepared from adipic acid and methyl bis(3-aminopropyl)amine by the following procedure.

Methyl bis(3-aminopropyl)amine (302.7 g of 96% assay material, 2 moles) and 85 ml of water were charged to a reaction vessel, and then 292.3 g (2 moles) of adipic acid was added cautiously over a period of about 30 minutes. The temperature was raised to 170–172° C. and maintained while the water of polycondensation was removed by distillation. The resulting polyamide was diluted with 425 ml of water and cooled to room temperature. The total solids were 50.3%, and the intrinsic viscosity 0.121 dL/g.

The polyaminoamide (114.3 g of the 50.3% solids aqueous solution, 0.225 equivalents of tertiary amine) was charged to a reaction vessel followed by 11.2 g of 0.097% solution (0.025 moles) of vinyl amine/vinyl alcohol copolymer, (6 moles % vinyl amine, 94 mole % vinyl alcohol, unit molecular weight 43.99). The resulting mixture was then diluted with water to a total weight of 195.2 g and then the pH was adjusted to 8.5 with concentrated sulfuric acid. Epichlorohydrin (5.24 g, 0.0566 moles) was added followed by heating to 55° C. When the Gardner-Holt viscosity reached "H-I", 55 ml of dilution water was added, and the pH was adjusted to 3.3–3.5 with concentrated sulfuric acid. The total solids were 25.1%, the pH 3.3, and the Brookfield viscosity 35 cps.

In Examples 22–28, the reactions were carried out in the same way and differed from Example 21 in the mole percent vinyl amine in the vinyl amine copolymer and the ratio of polyaminoamide to vinyl amine copolymer. Table 3 summarizes the synthesis data for Examples 21–28. In all examples the total amine equivalents are the sum of the equivalents of tertiary amine available from polyaminoamide and equivalents of amine available from vinyl amine copolymer.

TABLE 3

Reaction of Epichlorohydrin with Mixtures of Adipic
Acid-Methyl bis(3-aminopropyl)amine
(MBAPA) Polyaminoamide and Vinyl Amine/Vinyl Alcohol Copolymer[1]
(Ratio: moles of epichlorohydrin to total amine equivalents = 0.25)

| Example No. | Moles[3] Polyamino-amide | Moles Vinyl Amine/Vinyl Alc. copolymer | Total Amine[2] Equivalents | Total Solids (%) | Brookfield Viscosity (cps) |
|---|---|---|---|---|---|
| Vinyl amine/vinyl alcohol copolymer containing 6 mole % vinyl amine ||||||
| 21 | 0.225 | 0.0015 | 0.2251 | 25.1 | 38 |
| 22 | 0.200 | 0.003 | 0.2002 | 25.2 | 42 |
| 23 | 0.175 | 0.0045 | 0.1753 | 25.3 | 37 |
| 24 | 0.150 | 0.006 | 0.1504 | 25.4 | 35 |
| 25 | 0.100 | 0.009 | 0.1005 | 25.3 | 42 |
| Vinyl amine/vinyl alcohol copolymer containing 12 mole % vinyl amine ||||||
| 26 | 0.225 | 0.003 | 0.2254 | 25.3 | 33 |
| 27 | 0.175 | 0.009 | 0.1761 | 25.3 | 31 |
| 28 | 0.125 | 0.015 | 0.1268 | 25.2 | 27 |

[1]The pH of the product solution in Examples 23 and 27 was 3.4. The pH in the remaining examples was 3.3.
[2]For Examples 21–25 this value is the sum of the moles of polyaminoamide and 0.06 × moles of vinyl amine copolymer.
For Examples 26–28 this value is the sum of the moles of polyaminoamide and 0.12 × moles of vinyl amine copolymer.

The resins were evaluated for adhesion properties on a laboratory adhesion tester consisting of a heated platen onto which a 4% candidate aqueous resin solution was sprayed. A sheet of paper (70/30 Northern softwood kraft/chemithermomechanical pulp, basis weight 30 lbs/3,000 sq ft) was brought into contact with the heated (96–104° C.) coated surface with a force of 10 kg. The sheet was then pulled away from the platen, and the force required determined using an Instron. The resins of Examples 1–28 were evaluated as prepared and after pH adjustment.

Comparative Examples A, B and C consisted of evaluation of commercial creping adhesives under the same conditions. Comparative Example A utilized Kymene®557H wet strength resin (available from Hercules Incorporated, Wilmington, Del.), a material used commercially as a creping adhesive, and Comparative Examples B and C utilized Crepetrol®80E cationic polymer (available from Hercules, Incorporated, Wilmington, Del.), a commercially available polyaminoamide/epichlorohydrin creping adhesive. The results of the evaluations are in Tables 4 and 5.

TABLE 4

Adhesion Evaluations of Epichlorohydrin-Adipic Acid/DETA Polyaminoamide-Vinyl Amine/Vinyl Alcohol Copolymer Resins

| Example No. | Adhesion at pH as Made (kg) | Adjusted pH | Adhesion at Adjusted pH (kg) |
| --- | --- | --- | --- |
| 1 | 19.9 | 6.5 | 14.5 |
| 2 | 18.4 | 6.5 | 16.3 |
| 3 | 20.5 | 6.5 | 15.6 |
| 4 | 14.0 | 6.5 | 12.6 |
| 5 | 12.0 | 6.5 | 13.4 |
| 6 | 22.6 | 6.5 | 15.7 |
| 7 | 16.0 | 6.5 | 14.4 |
| 8 | 12.9 | 6.5 | 10.7 |
| 9 | 15.3 | 6.5 | 12.2 |
| 10 | 15.9 | 6.5 | 13.4 |
| 11 | 13.5 | 6.5 | 13.2 |
| Comp. A | 9.8 | 6.5 | 9.2 |
| Comp. B | 14.5 | 6.5 | 8.8 |
| 12 | 22.6 | 4.5 | 20.1 |
| 13 | 18.8 | 4.5 | 13.1 |
| 14 | 19.4 | 4.5 | 17.1 |
| 15 | 22.0 | 4.5 | 17.3 |
| 16 | 23.2 | 4.5 | 20.0 |
| 17 | 17.8 | 4.5 | 14.4 |
| 18 | 21.0 | 4.5 | 16.3 |
| 19 | 20.0 | 4.5 | 18.9 |
| 20 | 19.7 | 4.5 | 14.9 |

TABLE 5

Adhesion Evaluations of Epichlorohydrin-Adipic Acid/MBAPA Polyaminoamide-Vinyl Amine/Vinyl Alcohol Copolymer Resins

| Example No. | Adhesion at pH as Made (kg) | Adjusted pH | Adhesion at Adjusted pH (kg) |
| --- | --- | --- | --- |
| 21 | 10.1 | 6.5 | 9.3 |
| 22 | 9.8 | 6.5 | 11.6 |
| 23 | 12.1 | 6.5 | 12.4 |
| 24 | 12.2 | 6.5 | 13.0 |
| 25 | 11.2 | 6.5 | 14.2 |
| 26 | 14.5 | 6.5 | 16.0 |
| 27 | 12.9 | 6.5 | 14.1 |
| 28 | 13.3 | 6.5 | 12.9 |
| Comp. C | 8.5 | 6.5 | 8.8 |

The data in Tables 4 and 5 indicate that the resin compositions of the invention performed in the adhesion evaluations at least as well, and in almost every example, substantially better than the commercially available creping adhesive resins utilized in Comparative Examples A, B and C.

EXAMPLE 29

This example describe the preparation of a reaction product of epichlorohydrin with a mixture of vinyl amine/vinyl alcohol copolymer and polyaminoamide prepared from azelaic acid and diethylenetriamine, and the evaluation of the reaction product for adhesion properties.

The apparatus consisted of a heated, one liter resin kettle with head, mechanical stirrer, Dean-Stark moisture trap, condenser and thermometer.

Diethylenetriamine (154.8 g, 1.5 moles) and 44 cc of water were charged to the reaction vessel. Azelaic acid (282 g, 1.5 moles) was cautiously added while keeping the temperature below 125° C. After addition, the temperature was raised to 170° C. and held until 80 cc of distillate was collected. The molten polyaminoamide was poured into an aluminum pan and cooled. The intrinsic viscosity was determined to be 0.703 dL/g (1M $NH_4Cl$, 2%, 25° C.).

The poly(azelaic acid-co-diethylenetriamine) polyaminoamide (57.5 g, 0.225 mole) was charged to the reaction vessel with 142 cc of water and stirred overnight. Poly(vinyl amine-co-vinyl alcohol) (6 mole % vinyl amine, 94 mole % vinyl alcohol, unit molecular weight 43.99) (1.1 g, 11 g 10% solution, 0.025 mole) was added and the pH adjusted to 8.5 with 96.3% $H_2SO_4$. Epichlorohydrin (5.24 g, 0.0566 mole) was then added, and the temperature was raised to 59–61° C. When the Gardner-Holt viscosity reached "F", 848 ml of water was added to give a total solids of 6%, pH 7.9, and Brookfield viscosity of 5 cps.

The adhesion properties of the material were determined by the same method described above. The platen temperature was 121° C. The adhesion observed was 30 kg, compared to a value of 21.1 kg for the control, (an epichlorohydrin reaction product of a diethylenetriamine-adipic acid polyaminoamide).

EXAMPLE 30

This example describe the preparation of a reaction product of epichlorohydrin with a mixture of vinyl amine/vinyl alcohol copolymer and polyaminoamide prepared from azelaic acid and methyl bis(3-aminopropyl) amine, and the evaluation of the reaction product for adhesion properties.

The apparatus consisted of a heated, one liter resin kettle with head, mechanical stirrer, Dean-Stark moisture trap, condenser and thermometer.

Methyl bis(3-aminopropyl)amine (290.6 g, 2.0 moles) was charged to the reaction vessel. Azelaic acid (376.4 g, 2.0 moles) was cautiously added while keeping the temperature below 125° C. After addition the temperature was raised to 170–172° C. and maintained there until 68 cc of water was removed. The polyamide was isolated by diluting with water to give a 49.4% hazy solution having an intrinsic viscosity of 0.110 dL/g (1 M NH4Cl, 2%, 25° C.).

The polyaminoamide (52.0 g, 105.4 g of 49.4% solution, 0.175 mole) was charged to the reaction vessel with 56 ml of water. The pH was adjusted to 8.5–8.6 with concentrated sulfuric acid. Poly(vinyl amine-co-vinyl alcohol) (MW 35,000, 6 mole % vinyl amine) (3.3 g, 32.4 g of 10.3% solution, 0.075 mole) was added and mixed thoroughly. Epichlorohydrin (4.2 g, 0.045 mole) was added and the reaction mixture heated to 53–54° C. At Gardner-Holt "N" the reaction mixture was diluted with 75 ml of water, and the pH was adjusted to 3.5 with sulfuric acid. The final product had a total solids of 25% and Brookfield viscosity of 76 cps.

The adhesion properties of the material were determined by the same method described above. The platen temperature was 121° C., and the pH of the resin composition was 3.5. The adhesion observed was 33.2 kg, compared to a value of 23.3 kg for the control, (Crepetrol®80E cationic polymer, available from Hercules Incorporated, Wilmington, Del.).

EXAMPLES 31–35 AND COMPARATIVE EXAMPLES D AND E

These examples describe the evaluation of resins of this invention in paper handsheets. The resins were prepared as in Examples 1–20 using epichlorohydrin, polyaminoamide from adipic acid, diethylenetriamine and vinyl amine/vinyl alcohol copolymer containing 6 mole % vinyl amine and 94 mole % vinyl alcohol. In all cases the ratio of moles of epichlorohydrin to total equivalents of amine was 1.26.

Paper handsheets were prepared using a 50/50 blend of Rayonier bleached Kraft/James River Burgess hardwood Kraft pulp beaten to 500 cc Canadian standard freeness at pH 7.5. Sheets were generated having a basis weight of 64.9 kg/1,000 m² containing 0.5% resin. Tensile strength was determined on naturally aged and cured handsheets. Comparative Example D was a control example where the resin was replaced by Kymene®557H wet strength resin, a commercial epichlorohydrin/polyaminoamide resin, available from Hercules Incorporated, Wilmington, Del., used for imparting both wet and dry strength to paper. In Comparative Example E no resin was used.

Properties of the handsheets are presented in Table 6.

TABLE 6

Properties of Handsheets Containing Resin Prepared By Reaction of Epichlorohydrin with Mixtures of Adipic Acid-Diethylenetriamine Polyaminoamide and Vinyl Amine/Vinyl Alcohol Copolymer

| Example No. | Polyaminoamide/ Vinyl Amine Copolymer Ratio[3] | Dry Tensile (kg/cm) | | Wet Tensile (kg/cm) | |
|---|---|---|---|---|---|
| | | Uncured[1] | Cured[2] | Uncured[1] | Cured[2] |
| 31 | 9:1 | 5.34 | 5.04 | 0.859 | 1.11 |
| 32 | 1.5:1 | 5.45 | 4.96 | 0.866 | 1.14 |
| 33 | 1:1.5 | 5.32 | 5.43 | 0.829 | 1.06 |
| 34 | 1:2.3 | 4.46 | 4.68 | 0.446 | 0.543 |
| 35 | 1:4 | 4.86 | 4.73 | 0.557 | 0.686 |
| Comp. D | (Kymene ®557H) | 5.32 | 5.43 | 0.832 | 1.17 |
| Comp. E | (No Resin) | 2.25 | 2.00 | 0.112 | 0.118 |

Resin added at 0.5% level based on dry pulp.
[1]8 days at 24° C.
[2]30 minutes at 80° C.
[3]Ratio of equivalents of polyaminoamide secondary amine to moles of vinyl amine/vinyl alcohol copolymer The data in Table 6 indicate that the dry strength observed shows no particular pattern with respect to the ratio of equivalents of secondary amine present in the polyaminoamide to the moles of vinyl amine copolymer used to make the resin composition. However, the wet strength results indicate that as the ratio decreases, the wet tensile decreases, and as the ratio decreased below about 1:1.5, the wet tensile decreases to levels below that found with Kymene®557H wet strength resin.

EXAMPLES 36–38 AND COMPARATIVE EXAMPLE F

Paper samples were also prepared using a laboratory former that simulates commercial conditions. The resins were the same as those used in Examples 31–35. The pulp was 70/30 blend of Rayonier bleached Kraft/James River Burgess hardwood Kraft pulp beaten to 425 cc Canadian standard freeness at pH 7.5. Sheets were generated having 64.9 kg/1,000 m² basis weight containing 0.5% resin. Tensile strength was determined on naturally aged and cured handsheets. Comparative Example F was a control example where the resin was replaced by Kymene®557H wet strength resin.

Properties of the sheets are presented in Table 7.

TABLE 7

Properties of Laboratory Former Sheets Containing Resin Prepared By Reaction of Epichlorohydrin with Mixtures of Adipic Acid-Diethylenetriamine Polyaminoamide and Vinyl Amine/Vinyl Alcohol Copolymer

| Example No. | Polyaminoamide/ Vinyl Amine Copolymer Ratio[3] | Dry Tensile (kg/cm) | | Wet Tensile (kg/cm) | |
|---|---|---|---|---|---|
| | | Uncured[1] | Cured[2] | Uncured[1] | Cured[2] |
| 36 | 9:1 | 5.30 | 5.88 | 0.882 | 1.13 |
| 37 | 1.5:1 | 5.45 | 5.77 | 0.854 | 1.05 |
| 38 | 1:1.5 | 5.36 | 5.54 | 0.789 | 0.991 |
| Comp. F | Kymene ®557H | 5.13 | 5.45 | 0.841 | 1.08 |

Resin added at 0.5% level based on dry pulp.
[1]8 days at 24° C.
[2]30 minutes at 80° C.
[3]Ratio of equivalents of polyaminoamide secondary amine to moles of vinyl amine/vinyl alcohol copolymer The data in Table 7 indicate that the dry strength observed was somewhat greater than that obtained with the control, and confirm the relative constancy of dry strength regardless of the ratio of equivalents of polyaminoamide secondary amine to moles of vinyl amine polymer used to make the resin composition. They also confirm that as that ratio decreases, the wet tensile decreases, but is not substantially different from that of the control Kymene®557H wet strength resin when the ratio was about 1:1.5 or higher.

EXAMPLES 39–41 AND COMPARATIVE EXAMPLE G

This series of examples illustrates the repulping of paper containing the resin prepared by reaction of epichlorohydrin with mixtures of adipic acid-diethylenetriamine polyaminoamide and vinyl amine/vinyl alcohol copolymer.

Procedure for repulping:

The paper was conditioned overnight at 23° C. and 50% relative humidity. The paper for testing was cut into 1 inch squares. A total weight of 30 g of paper was used for the test.

Demineralized water (1970 ml) was added to the stainless steel container of a TAPPI Standard Pulp Disintegrator, Model SE 003. The disintegrator was turned on to begin agitation, and the water was heated to 50° C. Then the agitation was stopped, and the pre-weighed cut paper was added. The paper was allowed to soak for 15 minutes at 50° C., and then the disintegrator was turned on, and the paper slurry was allowed to repulp for 5 to 15 minutes at 3,000 rpm by setting the appropriate number of revolutions on the disintegrator. The temperature was maintained at 50° C. throughout.

Procedure for Measuring Fiber Yield

A Huygen Instruments Somerville Fractionating Screen, Model BK-34 was utilized for determination of fiber yield. It was connected to a standard tap water supply at the control panel. The drain valve at the bottom of the overflow reservoir was closed and tap water was allowed to fill the screen box. The water pressure flushing the slotted screen was adjusted to 124 kPa. The water level above the screen (4 inches) was controlled by inserting the weir in the overflow reservoir. A circular 150 mesh sieve screen was placed at the discharge of the reservoir to collect fiber accepts that pass through the stainless steel slotted screen.

After the disintegrator stopped, a 300 ml aliquot of the repulped slurry was removed and added to the water-filled screen box. The Somerville Fractionating unit was run for 10 minutes after addition of the slurry, at the end of which time no more fibers could be observed in the outflow from the slotted screen. Then the unit was switched off at the control panel, and the water was allowed to drain through the 150 mesh sieve. The weir was removed from the overflow reservoir, and the weir and the reservoir was rinsed with water, which was drained through the sieve.

The screen box was opened, and with a small squeegee the rejects (unrepulped paper, bundles and shives) on the surface of the slotted screen were collected into a plastic container. Material remaining on the screen and in the slots was rinsed into the container. The rejected slurry was poured into a Buchner funnel containing a tared filter paper under suction. The filter paper containing the rejects was dried on a hot plate to constant weight (about 5 minutes), and the dry weight of the rejected fraction was recorded.

The accept fraction (fully repulped fibers) was transferred from the 150 mesh screen into the plastic container. The sieve was rinsed to collect any remaining fibers into the plastic container. The accept slurry was poured under suction into a Buchner containing a tared filter paper. The filter paper was dried on a hot plate to constant weight (about 5 minutes), and the dry weight of the accepts was recorded.

Repulpability, as percent fiber recovery or percent fiber yield, was calculated as 100×(dry weight of accepts)(dry weight of accepts+rejects). The pH was repulping, repulping time and percent fiber yield were reported.

In Examples 39–41 and Comparative Example G, repulping was carried out using demineralized water, pH 7, at 50° C. and 1.5% consistency. The results are presented in Table 8.

TABLE 8

Repulping Results: Laboratory Former Sheets Containing Resin Prepared By Reaction of Epichlorohydrin with Mixtures of Adipic Acid-Diethylenetriamine Polyaminoamide and Vinyl Amine/Vinyl Alcohol Copolymer

| Example No | Paper Made in Example No. | Repulping Time (min) | After Repulp pH | Fiber Yield (%) |
|---|---|---|---|---|
| 39 | 36 | 5 | 7.1 | 32.1 |
|  | 36 | 10 | 7.1 | 57.3 |
|  | 36 | 15 | 7.1 | 75.1 |
| 40 | 37 | 5 | 7.3 | 31.0 |
|  | 37 | 10 | 7.3 | 56.5 |
|  | 37 | 15 | 7.4 | 70.7 |
| 41 | 38 | 5 | 7.5 | 38.9 |
|  | 38 | 10 | 7.6 | 65.1 |
|  | 38 | 15 | 7.5 | 97.3 |
| Comp. G | Comp. F | 5 | 6.6 | 37.9 |
|  | Comp. F | 10 | 6.9 | 64.2 |
|  | Comp. F | 15 | 7.1 | 76.6 |

The results in Table 8 demonstrate that the paper containing resin prepared by reaction of epichlorohydrin with a mixture of adipic acid-diethylenetriamine polyaminoamide and vinyl amine copolymer repulps more completely than paper containing Kymeme®557H wet strength resin alone at the same level, when the ratio of equivalents of secondary amine contributed by polyaminoamide to the number of moles of vinyl amine copolymer used to make the resin composition is no greater than about 1:1.5.

EXAMPLES 42–44 AND COMPARATIVE EXAMPLES H AND J

These examples illustrate the properties of paper containing resin which is the reaction product of epichlorohydrin, vinyl amine copolymer and polyaminoamide that is the reaction product of malonic acid and diethylenetriamine.

Poly(malonic acid-co-diethylenetriamine)/poly(vinyl amine-co-vinyl alcohol)/epichlorohydrin resins were prepared as described in Example 1 at several ratios of equivalents of polyaminoamide secondary amine to moles of vinyl amine copolymer. In all cases the ratio of moles of epichlorohydrin to equivalents of amine in the polyamide and vinyl amine copolymer was 1.26.

Handsheets at an end basis weight of 48.7 kg/1,000 m$^2$ and containing the strength resin at 0.5 wt. % were prepared and evaluated as in Examples 31–35. In Comparative Example H, Kymene® 557 wet strength resin was used at 0.5 wt. % in place of the strength resin. In Comparative Example J, no resin was used. The results are presented in Table 9.

TABLE 9

Wet and Dry Strength Properties of Handsheets Containing Resin Prepared By Reaction of Epichlorohydrin with Mixtures of Malonic Acid-Diethylenetriamine Polyaminoamide and Vinyl Amine/Vinyl Alcohol Copolymer

| Example No. | Ratio Equivalents Polyaminoamide 2° Amine/Moles Vinyl Amine/Vinyl Alc. Copolymer | Dry Tensile (kg/cm) | | Wet Tensile (kg/cm) | |
|---|---|---|---|---|---|
| | | Uncured[1] | Cured[2] | Uncured[1] | Cured[2] |
| 42 | 9:1 | 2.30 | 2.25 | 0.611 | 0.725 |
| 43 | 2.3:1 | 2.07 | 2.27 | 0.605 | 0.714 |
| 44 | 1:1 | 2.11 | 2.18 | 0.595 | 0.659 |
| Comp. H | (Kymene ®557) | 2.05 | 2.16 | 0.557 | 0.661 |
| Comp. J | (No resin) | 2.25 | 2.00 | 0.120 | 0.118 |

Resin added at 0.5% level based on dry pulp.
[1]Two weeks natural aging
[2]30 minutes at 80° C.

These results demonstrate substantial wet and dry strength for the paper at a wide range of ratios of equivalents of polyaminoamide secondary amine to moles of vinyl amine copolymer.

EXAMPLES 45–52 AND COMPARATIVE EXAMPLES K AND L

These examples illustrate the properties of paper made using strength resins which were the reaction products of epichlorohydrin, vinyl amine copolymer and polyaminoamides which were the reaction products of succinic acid and methyl bis(3-aminopropyl) amine, adipic acid and methyl bis(3-aminopropyl) amine.

The general procedure for preparation of the strength resins was as described here for succinic acid-co-methyl bis(3-aminopropyl)amine polyaminoamide/poly(vinyl amine-co-vinyl alcohol)/epichlorohydrin resin (Example 45).

The succinic acid-co-methyl bis(3-aminopropyl)amine polyaminoamide was prepared by the method described in U.S. Pat. No. 5,338,807. The polyaminoamide, 51.2 g (0.225 mole) was charged to a reaction vessel with 226 ml of water and stirred until dissolved. Poly(vinyl amine-co-vinyl alcohol) (6 mole % vinyl amine, weight average molecular wt. 95,000), 11 g of 10% solution (0.025 mole) was added and the mixture was stirred until it was clear. The pH was adjusted to 9.5 with concentrated HCl. Epichlorohydrin (26.2 g, 0.283 mole) was added, and the reaction mixture was then heated to 65–70° C. When the Gardner Holt viscosity reached "N", 78 ml of water was added and the pH adjusted to 2 with concentrated HCl. The temperature was raised to 70° C. and HCl was added on demand until the pH held constant at 2 for 1 hour.

The remainder of the strength resins were synthesized in analogous fashion. In all cases the ratio of moles of epichlorohydrin to equivalents of amine in the polyamide and vinyl amine copolymer was 1.24–1.25.

Handsheets at an end basis weight of 48.7 g/1,000 m² containing the strength resin at 0.5 wt. % were prepared from 100% groundwood beaten to 500 cc Canadian Standard freeness at pH 7.5 as in Examples 31–35. The strength resins were activated with caustic prior to evaluation. In Comparative Example K, Kymene® 557 wet strength resin was used at 0.5 wt. % in place of the strength resin. In Comparative Example L, no resin was used. The results are presented in Table 10.

TABLE 10

Wet and Dry Strength Properties of Handsheets Containing Resin Prepared By Reaction of Epichlorohydrin with Mixtures of Polyamioamide and Vinyl Amine/Vinyl Alcohol Copolymer

| Example | | Ratio: Equivalents Polyaminoamide 3° Amine/Moles vinyl | Dry Tensile (kg/cm) | | Wet Tensile (kg/cm) | |
|---|---|---|---|---|---|---|
| No. | Polyaminoamide | Amine/Vinyl Alc. | Uncured[1] | Cured[2] | Uncured[1] | Cured[2] |
| 45 | Poly[succinic acid-co-methyl bis(3-aminopropyl)amine] | 9:1 | 2.25 | 2.25 | 0.661 | 0.714 |
| 46 | Poly[succinic acid-co-methyl bis(3-aminopropyl)amine] | 1:1 | 2.23 | 2.16 | 0.555 | 0.548 |
| 47 | Poly[succinic acid-co-methyl bis(3-aminopropyl)amine] | 1:2.3 | 2.13 | 2.27 | 0.475 | 0.505 |
| 48 | Poly[succinic acid-co-methyl bis(3-aminopropyl)amine] | 1:9 | 2.20 | 2.16 | 0.263 | 0.288 |
| 49 | Poly[adipic acid-co-methyl bis(3-aminopropyl)amine] | 9:1 | 2.06 | 2.11 | 0.463 | 0.482 |
| 50 | Poly[adipic acid-co-methyl bis(3-aminopropyl)amine] | 1:1 | 2.23 | 2.20 | 0.446 | 0.468 |
| 51 | Poly[adipic acid-co-methyl bis(3-aminopropyl)amine] | 1:2.3 | 2.02 | 2.00 | 0.329 | 0.343 |
| 52 | Poly[adipic acid-co-methyl bis(3-aminopropyl)amine] | 1:9 | 2.11 | 2.09 | 0.254 | 0.293 |
| Comp. K | (Kymene ® 557) | | 2.02 | 2.13 | 0.605 | 0.698 |
| Comp. L | (No Resin) | | 2.25 | 2.00 | 0.112 | 0.118 |

Resin added at 0.5% level based on dry pulp.
1. Two weeks natural aging
2. 30 minutes at 80° C.

The data in Table 11 indicate that although the effectiveness of these resins as wet strength resin decreases as the ratio of equivalents of polyaminoamide tertiary amine to moles of vinyl amine-vinyl alcohol copolymer decreases, their effectiveness as dry strength resins remains substantially constant.

It is not intended that the examples presented here should be construed to limit the invention, but rather they are submitted to illustrate some of the specific embodiments of the invention. Various modifications and variations of the present invention can be made without departing from the scope of the appended claims.

What is claimed is:

1. A resin composition comprising the reaction product of epihalohydrin with a mixture comprising polyaminoamide and vinyl amine polymer containing from about 1 to about 100 mole percent vinyl amine monomer units.

2. The resin composition of claim 1 that is an interpenetrating polymer network.

3. The resin composition of claim 1 wherein the vinyl amine polymer contains from about 4 to about 100 mole percent vinyl amine monomer units.

4. The resin composition of claim 3 wherein the vinyl amine polymer contains from about 5 to about 100 mole percent vinyl amine monomer units.

5. The resin composition of claim 1 wherein the polyaminoamide comprises the reaction product of dicarboxylic acid or a derivative thereof, with polyamine selected from the group consisting of methyl bis(3-aminopropyl) amine and polyalkylenepolyamine, the polyalkylenepolyamine containing from two to four alkylene groups having two to four carbons, two primary amine groups and one to three secondary amine groups.

6. The resin composition of claim 5 wherein the polyamine is polyalkylenepolyamine containing from two to four alkylene groups having two to four carbons, two primary amine groups, and one to three secondary amine groups.

7. The resin composition of claim 6 wherein the polyamine is selected from the group consisting of diethylenetriamine, triethylenetetramine and tetraethylenepentamine.

8. The resin composition of claim 7 wherein the polyamine is diethylenetriamine.

9. The resin composition of claim 5 wherein the polyamine is methyl bis(3-aminopropyl) amine.

10. The resin composition of claim 5 wherein the dicarboxylic acid comprises at least one member selected from the group consisting of saturated aliphatic dicarboxylic acids containing three to ten carbon atoms, phthalic acid, terephthalic acid and diglycolic acid.

11. The resin composition of claim 10 wherein the saturated aliphatic dicarboxylic acid is selected from the group consisting of malonic acid, succinic acid, glutaric acid, adipic acid, pimelic acid, suberic acid and azelaic acid.

12. The resin composition of claim 11 wherein the saturated aliphatic dicarboxylic acid is adipic acid.

13. The resin composition of claim 11 wherein the saturated aliphatic dicarboxylic acid is azelaic acid.

14. The resin composition of claim 10 wherein the saturated aliphatic dicarboxylic acid is selected from the group consisting of malonic acid, succinic acid, azelaic acid and adipic acid.

15. The resin composition of claim 5 wherein the polyaminoamide is the reaction product of adipic acid or a derivative thereof, and diethylenetriamine.

16. The resin composition of claim 5 wherein the polyaminoamide is the reaction product of azelaic acid or a derivative thereof, and diethylenetriamine.

17. The resin composition of claim 5 wherein the polyaminoamide is the reaction product of azelaic acid, or a derivative thereof, and methyl bis(3-aminopropyl) amine.

18. The resin composition of claim 1 wherein the epihalohydrin is epichlorohydrin.

19. The resin composition of claim 1 wherein the vinyl amine polymer is a copolymer containing additional monomer units selected from the group consisting of vinyl alcohol, vinyl acetate and N-vinyl formamide.

20. The resin composition of claim 19 wherein the vinyl amine polymer is a copolymer containing alcohol monomer units.

21. The resin composition of claim 20 wherein the vinyl amine copolymer comprises from about 1 to about 99 mole percent vinyl amine monomer units and from about 99 to about 1 mole percent vinyl alcohol monomer units.

22. The resin composition of claim 21 wherein the vinyl amine copolymer comprises from about 4 to about 50 mole percent vinyl amine monomer units and from about 96 to about 1 mole percent vinyl alcohol monomer units.

23. The resin composition of claim 22 wherein the vinyl amine copolymer comprises from about 5 to about 25 mole percent vinyl amine monomer units and from about 95 to about 1 mole percent vinyl alcohol monomer units.

24. The resin composition of claim 23 wherein the vinyl amine copolymer comprises from about 5 to about 12 mole percent vinyl amine monomer units and from about 95 to about 1 mole percent vinyl alcohol monomer units.

25. The resin composition of claim 1 wherein the ratio of equivalents of amine in the polyaminoamide to moles of vinyl amine polymer is from about 0.1:1 to about 10:1.

26. The resin composition of claim 25 wherein the ratio of equivalents of amine in the polyaminoamide to moles of vinyl amine polymer is from about 0.6:1 to about 9:1.

27. The resin composition of claim 1 wherein the ratio of moles of epihalohydrin to equivalents of amine in the polyaminoamide and vinyl amine polymer is from about 0.1:1 to about 2:1.

28. The resin composition of claim 27 wherein the ratio of moles of epihalohydrin to equivalents of amine in the polyaminoamide and vinyl amine polymer is from about 0.15:1 to about 1.5:1.

29. The resin composition of claim 28 wherein the ratio of moles of epihalohydrin to equivalents of amine in the polyaminoamide and vinyl amine polymer is from about 0.2:1 to about 1.3:1.

30. The resin composition of claim 1 wherein the epihalohydrin is epichlorohydrin, the polyaminoamide is the reaction product of dicarboxylic acid or a derivative thereof, selected from the group consisting of saturated aliphatic dicarboxylic acids containing three to ten carbon atoms, phthalic acid, terephthalic acid diglycolic acid, and polyamine selected from the group consisting of methyl bis(3-aminopropyl) amine and polyalkylenepolyamine containing from two to four alkylene groups having two to four carbons, two primary amine groups, and one to three secondary amine groups, and the vinyl amine polymer is a copolymer containing vinyl alcohol monomer units.

31. The resin composition of claim 30 wherein the ratio of equivalents of polyaminoamide secondary amine to moles of vinyl amine copolymer is from about 0.1:1 to about 10:1, the vinyl amine copolymer comprises from about 2 to about 98 mole percent vinyl amine monomer units and from about 2 to about 98 mole percent vinyl alcohol monomer units, and the ratio of moles of epihalohydrin to equivalents of amine in the polyaminoamide and vinyl amine copolymer is from about 0.1:1 to about 2:1.

32. An aqueous solution of the resin composition of claim 1 wherein the solution includes from about 0.1 to about 10 weight percent of the resin composition.

33. A process for making the resin composition of claim 1 comprising providing a mixture of polyaminoamide and vinyl amine polymer containing from about 1 to about 100 mole percent vinyl amine, and reacting the mixture with epihalohydrin.

34. A process for creping fibrous webs comprising:
 (a) providing a fibrous web;
 (b) applying to a drying surface for the fibrous web the resin composition of claim 1;
 (c) pressing the fibrous web against the drying surface to adhere the web to the drying surface; and
 (d) dislodging the web from the drying surface with a creping device to crepe the fibrous web.

35. The process of claim 34 wherein the web is a cellulosic web.

36. The process of claim 34 wherein the resin composition is applied in aqueous solution.

37. The process of claim 35 wherein the drying surface is the cylinder of a Yankee dryer.

38. The process of claim 34 wherein the resin composition is applied to a drying surface for the fibrous web.

39. The process of claim 34 wherein the resin composition is applied by spraying.

40. The process of claim 34 wherein the epihalohydrin is epichlorohydrin, the polyaminoamide is the reaction product of dicarboxylic acid or a derivative thereof, selected from the group consisting of saturated aliphatic dicarboxylic acids containing three to ten carbon atoms, phthalic acid, terephthalic acid and diglycolic acid, and polyamine selected from the group consisting of methyl bis(3-aminopropyl) amine and polyalkylenepolyamine containing from two to four alkylene groups having two to four carbons, two primary amine groups, and one to three secondary amine groups, and the vinyl amine polymer is a copolymer containing vinyl alcohol monomer units.

41. The process of claim 40 wherein the ratio of equivalents of polyaminoamide secondary amine to moles of vinyl amine copolymer is from about 0.1:1 to about 10:1, the vinyl amine copolymer comprises from about 2 to about 98 mole percent vinyl amine monomer units and from about 2 to about 98 mole percent vinyl alcohol monomer units, and the ratio of moles of epihalohydrin to equivalents of amine in the polyaminoamide and vinyl amine copolymer is from about 0.1:1 to about 2:1.

42. The process of claim 41 wherein the dicarboxylic acid is adipic acid and the polyamine is diethylenetriamine.

43. The process of claim 41 wherein the dicarboxylic acid is adipic acid and the polyamine is methyl bis(3-aminopropyl) amine.

44. The process of claim 41 wherein the dicarboxylic acid is azelaic acid and the polyamine is diethylenetriamine.

45. The process of claim 41 wherein the dicarboxylic acid is azelaic acid and the polyamine is methyl bis(3-aminopropyl) amine.

46. A process for making paper comprising:

(a) providing an aqueous pulp suspension;

(b) adding to the aqueous pulp suspension the resin composition of claim 1; and (c) sheeting and drying the aqueous pulp suspension produced in (b) to obtain paper.

\* \* \* \* \*